June 4, 1935.  H. GROSS  2,003,773

BURNER GUARD FOR COOKING UTENSILS

Filed July 19, 1933   2 Sheets-Sheet 1

INVENTOR
HERMAN GROSS
BY Zoltan Holachek
ATTORNEY

June 4, 1935. H. GROSS 2,003,773

BURNER GUARD FOR COOKING UTENSILS

Filed July 19, 1933 2 Sheets-Sheet 2

INVENTOR
HERMAN GROSS
BY
ATTORNEY

Patented June 4, 1935

2,003,773

UNITED STATES PATENT OFFICE 2,003,773

BURNER GUARD FOR COOKING UTENSILS

Herman Gross, New York, N. Y.

Application July 19, 1933, Serial No. 681,074

6 Claims. (Cl. 126—215)

This invention relates to new and useful improvements in cooking utensils.

The invention has for an object the construction of a cooking utensil or the provision of an adapter for a cooking utensil which is arranged so as to allow the heat from the burner to heat the bottom of the cooking utensil at the same time holding away the flame so as not to discolor and burn said bottom.

Furthermore as another object of this invention an arrangement is proposed whereby an annular wall surrounds the bottom wall of a pot or the like, a false bottom is associated with the pot and removably mounted within said annular wall and having openings, and the provision of baffles adjustably mounted upon the false bottom and having openings alignable with said openings and movable to a position in which said openings are out of alignment to any desirable degree.

Still further the invention contemplates the provision of a plurality of prongs mounted within an annular wall for surrounding the bottom of a pot, a disc member mounted upon said prongs for forming a rest for the pot, and a flame control baffle adjusting mechanism mounted within said annular wall and supported upon said prongs.

Furthermore the invention also contemplates arranging the baffle construction slightly arched upwards so as to direct the flame away from the bottom of the pot and at the same time allow a large degree of the heat to reach the pot.

Furthermore as another object of this invention an arrangement is proposed whereby the baffle mechanism comprises several baffle plates spaced from each other and movably arranged to provide for the adjustments previously mentioned.

Furthermore as another object of this invention an arrangement is proposed whereby the baffle plates may be moved to various distances from each other to control the flame and passage of heat as hereinafter further described.

Furthermore as another object of this invention it is proposed to construct a device as mentioned which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
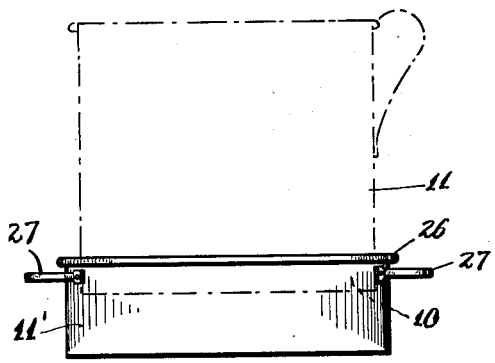
Fig. 1 is a side elevational view of a cooking utensil according to this invention.
Figure 2:
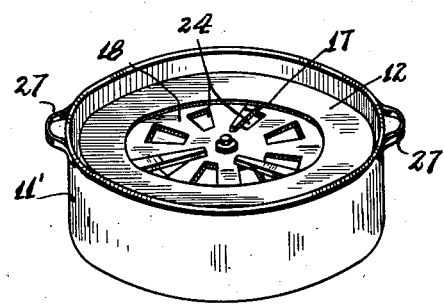
Fig. 2 is a perspective view of the bottom portion of Fig. 1 showing in particular the adapter per se.
Figure 3:
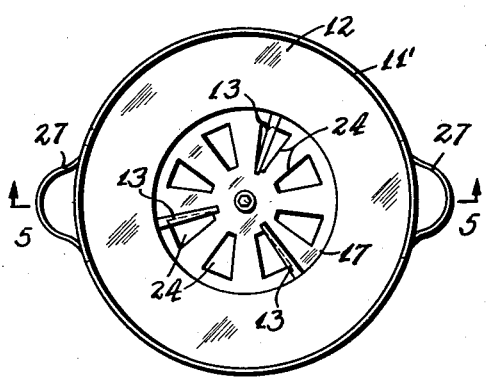
Fig. 3 is a plan view of Fig. 2.
Figure 4:
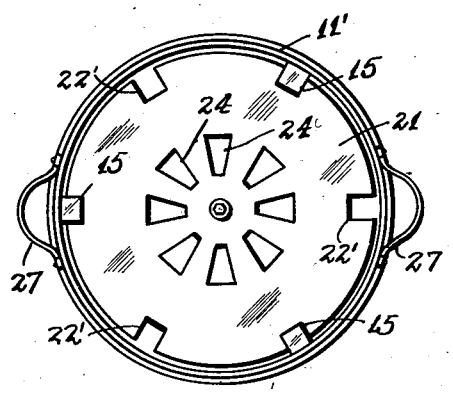
Fig. 4 is a bottom view of Fig. 2.
Figure 5:
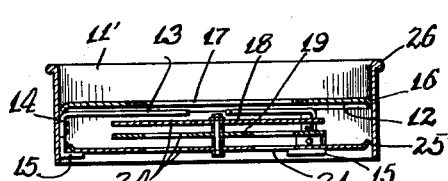
Fig. 5 is a sectional view taken on the line 5—5 of Fig. 3.
Figure 6:
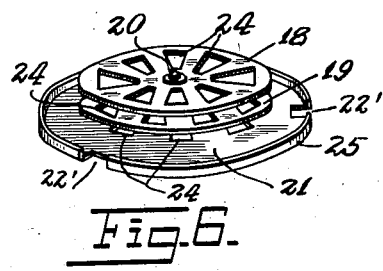
Fig. 6 is a perspective view of the baffle mechanism removed from Fig. 5.

The invention consists of cooking utensils which may be made from various metals such as copper, aluminum and the like, and comprises in combination with the bottom wall 10 of a pot 11 or the like, an annular wall 11' surrounding said bottom wall 10 and holding a false bottom 12 adapted to support the bottom wall 10, that is, to support the pot 11. This false bottom 12 is removably mounted. More particularly several prongs are mounted upon the inner side of the annular wall 11' and comprise top horizontal portions 13 extended radially and joined with small vertical portions 14 attached upon the inner side of the wall 11' and connecting with bottom horizontal portions 15. The false bottom 12 has its edge 16 turning downwards and this edge rests upon the prongs at the junctions of the top and side portions so as to removably hold the false bottom. The false bottom 12 is formed with a circular opening 17 to expose certain baffle mechanism therebeneath as hereinafter further described.

A baffle mechanism is adjustably mounted beneath the false bottom 12 and comprises several baffle discs 18 and 19 spaced from each other and adjustably mounted. More particularly these baffle discs are mounted upon a bolt 20 which is extended through a bottom disc 21. Spacing collars 22 are mounted upon the bolt 20 between the baffle discs 18 and 19 and the disc 21 so as to hold these parts properly spaced and at the same time to allow relative rotation. The bottom disc 21 is formed with several openings 22' corresponding in location with the bottom portions 15 of the prongs previously mentioned. The arrangement is such that the bottom disc 21 may be set into the inner wall 11' by properly holding it so that the openings 22' pass over the bottom ends 15. Then the disc 21 may be partially rotated to offset the openings so that the bottom disc maintains its position.

Each of the baffle discs 18 and 19 are formed with congruent openings 24. These discs 18 and 19 are adapted to assume various rotative positions, positions in which they are manually set. The bottom disc 21 is also formed with openings 24 corresponding in size and shape with the other openings 24. The arrangement is such that the baffle discs 18 and 19 may be set to be out of alignment with each other so that the flame of the burner cannot travel the zig zag path necessary to reach the bottom of the pot while heated air may readily travel this path and so reach and heat the pot. The bottom disc 21 shown is formed with an upturned edge 25 which adds rigidity to the construction. The upper edge 26 of the annular wall 11 is shown coiled or formed with some type of finish. A pair of diametrically opposite handles 27 are mounted upon the annular wall 11' so that the device may be readily handled.

Figure 8:
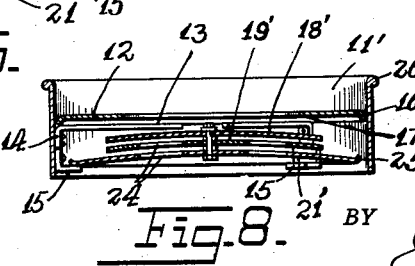
Fig. 8 is a view similar to Fig. 5 but showing a slight modification.
Figure 9:
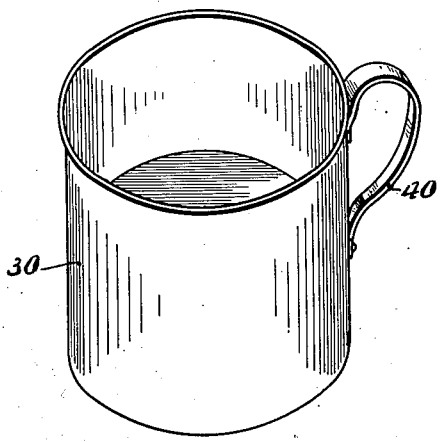
Fig. 9 is a perspective view of a cooking pot constructed according to another embodiment of the invention.
Figure 7:
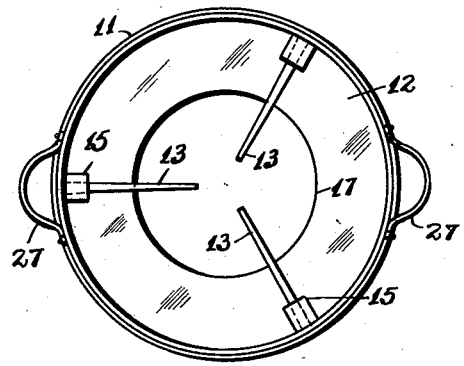
Fig. 7 is a bottom view of Fig. 5 after the baffle mechanism shown in Fig. 6 has been removed.
Figure 10:
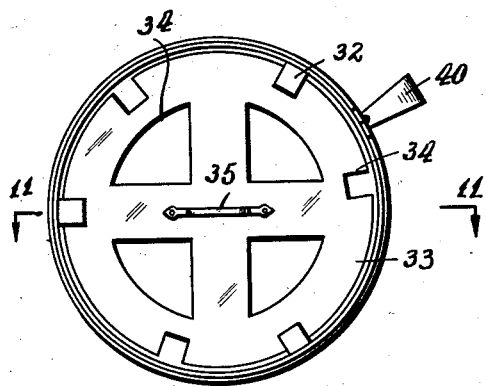
Fig. 10 is a bottom elevational view of Fig. 9.
Figure 11:
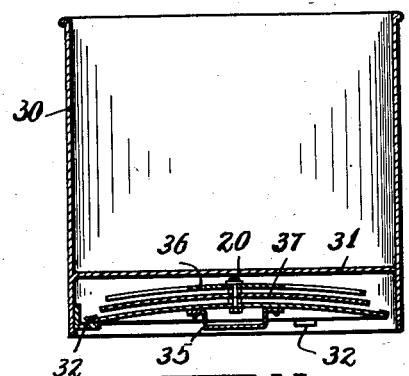
Fig. 11 is a sectional view taken on the line 11—11 of Fig. 10.
Figure 12:
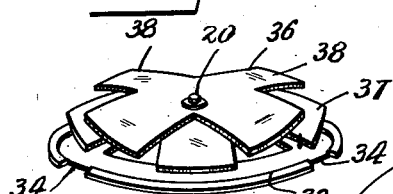
Fig. 12 is a perspective view of the baffle mechanism removed from Fig. 11.
Figure 13:
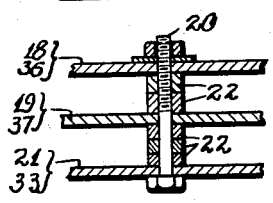
Fig. 13 is a fragmentary vertical sectional view showing in detail the manner in which the baffle discs are spaced from each other.

In Fig. 8 a modified arrangement has been disclosed which is very similar to the previous form except for the fact that the bottom disc 21', and the baffle discs 18' and 19' are all similarly arched. This construction adds great rigidity to these discs and at the same time does not interfere with the passage of the heat. Furthermore the arched arrangement causes the flame to be directed upwards towards the center and so produce great efficiency in heating.

In Figs. 9-12 inclusive a modified arrangement of the invention has been disclosed in which a pot 30 is illustrated having a bottom 31 set in from the bottom edge of the side wall so as to produce a bottom hollow. Several clips 32 are attached inside of the bottom hollow and are arranged to support a bottom disc member 33 which is formed with several openings 34 arranged to align in a certain position with the supports 32 so that the disc 33 may be removed when desired. The disc 33 is formed with several openings 34 for the passage of heated air. A handle 35 is mounted upon the bottom of the disc 33. Several baffle members 36 and 37 are adjustably mounted upon the bottom disc 33. These baffle members are formed with radial arms 38 spaced from each other so that these arms may overlap the openings 34. The adjustable mounting of the baffle discs 36 and 37 is accomplished by a bolt 20 which engages through the bottom disc 33 and which is equipped with several spacing bushings or collars 22 as previously described relative to the baffle discs 18 and 19. The arrangement allows the discs 36 and 37 to be rotated to various positions so that the flame is stopped but the heated air may take a zig zag path to the pot. The pot is shown provided with a handle 40. The disc 33 and the baffle discs 36 and 37 are shown arched upwards. In other respects this form of the invention is similar to the preferred form.

Figure 14:
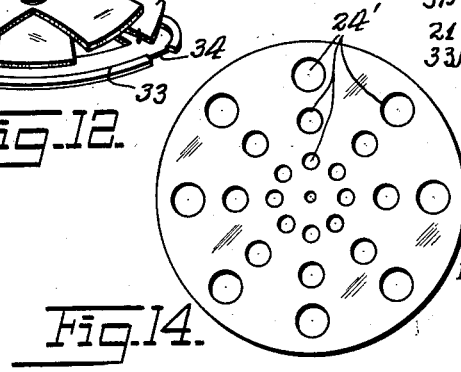
Fig. 14 is a plan view of a modified form of baffle disc.

In Fig. 14, a plurality of circular holes 24' are shown in a baffle disc, in other respects this disc is the same as those shown in the previous figures.

Spacers or bushings 22 are made of a number of rings of different widths and they may be interchanged to produce suitable spacings between the various baffle discs. By means of this bushing arrangement it is also possible to place two baffle discs in adjacent relation to double the width of the baffle disc and to eliminate the intermediate baffle disc. Instead of using three of these discs, a smaller or larger number of different shapes of baffle discs may be used to suit various conditions.

It is to be understood that my improved cooking utensil and parts thereof may be made of any suitable material and that their shapes, sizes, propotions, may be varied as desired.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A burner guard for cooking utensils, comprising an annular wall for surrounding a bottom wall for a cooking utensil, a false bottom beneath said bottom wall removably mounted within said annular wall and having openings, and baffles adjustably mounted on said false bottom and having openings and movable to positions in which said openings align to any desirable amount, prongs being attached upon the inside of said annular wall and serving to form a support for said false bottom, said prongs having lower horizontal portions, and said baffles being joined in a unit and having a bottom disc with openings corresponding in location with said bottom prong portions so that the baffle mechanism is removably held.

2. A burner guard for cooking utensils, comprising an annular wall for surrounding a bottom wall of a cooking utensil, several prongs attached upon said annular wall and spaced from each other and having inwardly directed top horizontal portions with small inwardly directed bottom portions, a false bottom supported upon said top inwardly directed portions, a disc having peripheral cutouts adapted to slide over said bottom inwardly directed portions and to be slightly turned to maintain its position, and several discs adjustably mounted upon said bottom disc and having openings alignable with similar openings formed in said bottom disc.

3. A burner guard for cooking utensils, comprising an annular wall for surrounding a bottom wall of a cooking utensil, several prongs attached upon said annular wall and spaced from each other and having inwardly directed top horizontal portions with small inwardly directed bottom portions, a false bottom supported upon said top inwardly directed portions, a disc having peripheral cutouts adapted to slide over said bottom inwardly directed portions and to be slightly turned to maintain its position, and several baffle discs adjustably mounted upon said bottom disc and having openings alignable with similar openings formed in said bottom disc, said baffle discs being rotatively mounted upon a bolt connected with said bottom disc, and collars interposed between these parts to hold them in properly spaced relations.

4. A burner guard for cooking utensils, comprising an annular wall for surrounding a bottom wall of a cooking utensil, several prongs attached upon said annular wall and spaced from each other and having inwardly directed top horizontal portions with small inwardly directed bottom portions, a false bottom supported upon said top inwardly directed portions, a disc having peripheral cutouts adapted to slide over said bottom inwardly directed portions and to be slightly turned to maintain its position, and several baffle discs adjustably mounted upon said bottom disc and having openings alignable with similar openings formed in said bottom disc, said bottom disc having its edge turned at right angles.

5. A burner guard for cooking utensils, comprising an annular wall for surrounding a bottom wall of a cooking utensil, several prongs attached upon said annular wall and spaced from each other and having inwardly directed top horizontal portions, with small inwardly directed bottom portions, a false bottom supported upon said top inwardly directed portions, a disc having peripheral cutouts adapted to slide over said bottom inwardly directed portions and to be slightly turned to maintain its position, and several baffle discs adjustably mounted upon said bottom disc and having openings alignable with similar openings formed in said bottom disc, said bottom disc and baffle discs being arched.

6. A burner guard for cooking utensils, comprising an annular wall portion for surrounding a bottom wall of a cooking utensil, lugs attached upon the inner side of said annular wall, a perforated disc with edge cutouts engageable over said lugs and turnable to maintain its position, and several perforated baffle discs adjustably mounted upon said bottom disc.

HERMAN GROSS.